United States Patent

[11] 3,628,439

| [72] | Inventor | Motoyoshi Furusawa<br>Ohmiya, Japan |
|---|---|---|
| [21] | Appl. No. | 19,840 |
| [22] | Filed | Mar. 16, 1970 |
| [45] | Patented | Dec. 21, 1971 |
| [73] | Assignee | Fuji Shashin Koki Kabushiki Kaisha<br>Saitama-ken, Japan |
| [32] | Priorities | Nov. 11, 1969 |
| [33] | | Japan |
| [31] | | 44/106962;<br>Mar. 28, 1968, Japan, No. 44/27678 |

[54] PHOTOGRAPHIC CAMERA
1 Claim, 3 Drawing Figs.

| [52] | U.S. Cl. | 95/64 R,<br>95/42 |
|---|---|---|
| [51] | Int. Cl. | G03b 7/20,<br>G03b 17/12 |
| [50] | Field of Search | 95/10 C,<br>42, 64 R, 64 B |

[56] References Cited
UNITED STATES PATENTS

| 3,495,514 | 2/1970 | Nakamura et al. | 95/10 C |
|---|---|---|---|
| 3,163,097 | 12/1964 | Zenyoji et al. | 95/42 X |
| 3,262,380 | 7/1966 | Winkler | 95/10 C |
| 3,461,783 | 8/1969 | Fujii | 95/64 |
| 3,470,805 | 10/1969 | Suzuki et al. | 95/10 C X |
| 3,486,434 | 12/1969 | Suzuki et al. | 95/64 |

FOREIGN PATENTS

| 1,224,145 | 9/1966 | Germany | 95/64 |
|---|---|---|---|

*Primary Examiner* — Joseph F. Peters, Jr.
*Attorney* — Waters, Roditi, Schwartz and Nissen ABSTRACT: A photographic camera so constructed that a lens assembly having a lens tube is exchangeably screwed into the front face of a camera body. The lens assembly is provided with a rotatable diaphragm ring for manually adjusting the exposure aperture of the lens, and means for detecting the rotational position of the diaphragm ring and means for compensating an error in the mounting position of the lens assembly relative to the camera body are provided in the camera body in combination.

PATENTED DEC 21 1971  3,628,439

3,628,439

PHOTOGRAPHIC CAMERA

BACKGROUND OF THE INVENTION

The present invention relates to a diaphragm-control mechanism for photographic cameras having an exchangeable lens, and more particularly to a diaphragm-control mechanism adapted for use in a camera of the type in which a lens assembly is screwed on the camera body.

Cameras of the type in which the magnitude of the exposure aperture of the diaphragm and/or the shutter speed are regulated in accordance with the indication of an exposure meter provided in the camera, are widely used at the present time. In order to render the lens assembly exchangeable in this type of camera, it is essential that the lens assembly is mounted precisely in a predetermined position relative to the camera body. While the position of the lens assembly relative to the camera body can be determined relatively precisely where the lens assembly is mounted on the camera body by means of a bayonet-type mount, it tends to be varied in the type of camera wherein the lens assembly is mounted on the camera body by screw means, due to the production error of the screw. In general, the exposure aperture of a lens assembly is regulated by a diaphragm ring and information relating to the exposure aperture of the lens is obtained upon detecting the position of said diaphragm ring. Therefore, an error in the mounting position of the lens assembly relative to the camera body causes an error in the information on the exposure aperture of the lens and consequently the value of exposure, finally obtained, becomes erroneous.

SUMMARY OF THE INVENTION

The primary object of the present invention is to eliminate the above-described drawback possessed by the type of camera wherein the lens assembly is mounted on the camera body by means of screw thread.

More specifically, the object of the invention is to provide, in a device for detecting the diaphragm ring of the lens assembly, means for compensating an error in the mounting position of the lens assembly on the camera body.

In a preferred embodiment of the present invention, the position of the diaphragm ring is detected in terms of a change in electric resistance. Namely, the slider of a variable resistor is shifted corresponding to the rotational position of the diaphragm ring and the position of the contact of the resistance element of said variable resistor, corresponding to said slider, is adjusted according to the final position of the lens assembly relative to the camera body. The camera body is provided with a ring member rotatable along with the diaphragm ring of the lens assembly and the slider of the variable resistor is moved by said ring member. The contacts of the resistance element of the variable resistor are arranged side-by-side in a row on a baseplate, on which the slider moves in sliding engagement therewith. In screwing the lens assembly into the camera body, the baseplate is moved by the lens assembly in its final turn and set in position corresponding to the position of the lens assembly mounted on the camera body.

In another embodiment of the invention, the lens assembly is mounted on the camera body in such a condition that its diaphragm ring is rotated to the limit of its rotation in an exposure aperture-reducing direction and the direction in which the lens assembly is screwed into the camera body is same as said exposure aperture-reducing direction of the diaphragm ring. The slider of the variable resistor is mounted on a pivot lever which is biased by a spring in one direction, and said pivot lover is pivotally moved against the biasing force of said spring when the lens assembly is mounted on the camera body. The baseplate having the contacts of the resistance element of the resistor biasing is provided with a lug which will engage the pivot lever when said lever is pivotally moved against the biasing force of the spring. Thus, it will be seen that the baseplate is moved incident to the pivotal movement of the pivot lever in the mounting of the lens assembly on the camera body. The baseplate has the tendency of resisting against the above-mentioned movement, under the biasing force of a spring and is provided with means which retains the baseplate in position, upon completion of the mounting of the lens assembly, in engagement therewith.

These and other objects and features of the present invention will become apparent from the following detailed description taken in conjunction with the accompanying drawings.

DESCRIPTION OF THE PREFERRED EMBODIMENTS

Figure 1:
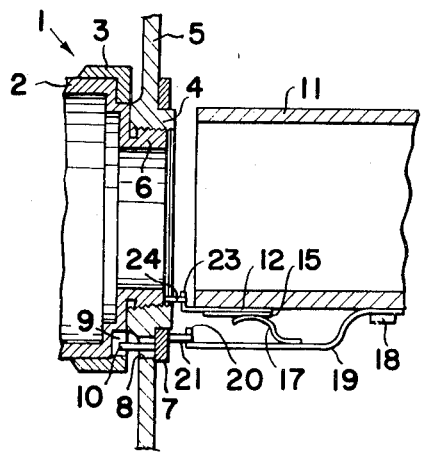
FIG. 1 is a vertical cross-sectional view of a lens assembly-mounting portion, showing an embodiment of the present invention.
Figure 2:
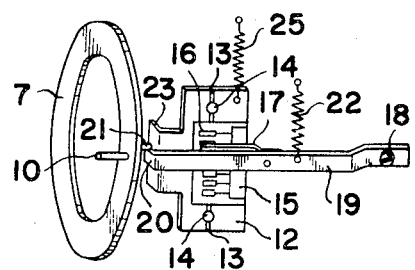
FIG. 2 is a perspective view showing the arrangement of a variable resistor in the embodiment in FIG. 1.

Referring to FIGS. 1 and 2 which show the first embodiment of the present invention, the lens assembly generally indicated by numeral 1 includes a lens tube 2 and a diaphragm-regulating ring 3, and the exposure aperture of the lens is adjusted in a known manner, by rotating said diaphragm ring 3. The lens tube 2 is provided at its inner end with an external thread 6 for screwing the lens assembly into a threaded mounting portion 4 of the camera body 5. The inside of the camera body 5 is provided with a rotatable ring 7 surrounding the mounting portion 4. A pin 10 is fixed to the front face of the ring 7, projecting forwardly through a slot 8 in the camera body 5 into a recess 9 formed in the diaphragm ring 3. The length of the pin 10 is so selected that said pin 10 is received in the recess 9 of the diaphragm ring 3 in the last turn of the lens assembly 1 in screwing said lens assembly into the camera body 5. A reflection preventing tube 11 is arranged interior of the camera body 5 in coaxial relation to the lens assembly 1, and a baseplate 12 is horizontally slidably mounted on the underside of said reflection-preventing tube 11 by means of a horizontal slot 13, formed in said baseplate, and screws 14. A resistor 15 is provided on the baseplate 12, which has a series of contacts 16 arranged in side-by-side relation, whereas a lever 19 is pivotally connected to the underside of the reflection-preventing tube 11 by means of a pivot pin 18, said lever 19 having a slider 17 for sliding engagement with the contacts 16 of said resistor 15. The free end of the lever 19 is angled at substantially right angles as indicated at 20, and a pin 21 is fixed to the ring 7 for engagement with the end 20 of said lever 19. Reference numeral 22 designates a tension spring to bias the lever 19 in one direction. The force of the spring 22 is transmitted to the ring 7 through the pin 21, to rotate said pin 7 in one direction. Thus, the pin 10 on the other side of the ring 7 is constantly held in engagement with one end of the recess 9 in the diaphragm ring 3.

The baseplate 12 has a forwardly extending lug formed at the front edge thereof and the end extremity of said lug is flexed at substantially right angles as indicated at 23. The rear end face of the lens tube 2 is provided with a pin 24 projecting rearwardly therefrom. In mounting the lens assembly 1 on the camera body 5, the pin 24 engages the flexed lug 23 of the baseplate 12 in the last turn of said lens assembly, displacing said baseplate 12 to a position corresponding to the position of the lens assembly 1 mounted on the camera body 5. Reference numeral 25 designates a return spring acting on the baseplate 12.

According to the above-described arrangement of the present invention, the position of the resistance element of the variable resistor, the resistance value of which is variable according to the position of the diaphragm ring 3 of the lens assembly 1, is adjusted in accordance with the position of the lens assembly 1 relative to the camera body 5. Therefore, the variation of the exposure aperture of the lens is indicated accurately as that in the resistance value of the variable resistor, even if the mounting position of the lens assembly 1 varies due to the production error of screw threads.

Figure 3:
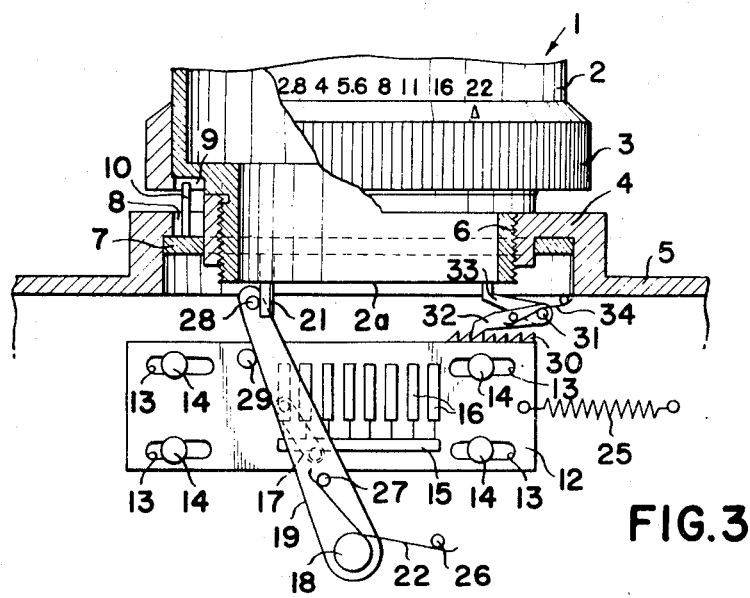
FIG. 3 is a plan view, partially in section, showing another embodiment of the invention.

FIG. 3 shows the second embodiment of the present invention, in which parts corresponding to those of the embodiment shown in FIGS. 1 and 2 are indicated by same numerals. In this embodiment, in mounting the lens assembly 1 on the camera body 5 a diaphragm ring 3 is retained in its ultimate position in the exposure aperture-reducing direction and the direction of the thread of the screw mount is the same as the direction in which the diaphragm ring 3 is rotated to reduce the exposure aperture of the lens, namely in the embodiment shown the thread is a left-hand thread. In this embodiment, therefore, the lens assembly 1 can be mounted by screwing, while holding the diaphragm ring 3 stationary. A lever 19, pivotally connected to the camera body by means of a pivot pin 18, is urged in a clockwise direction as viewed in FIG. 3, by a spring 22 which acts between a pin 26, fixed to the camera body 5, and a pin 27 on said lever 19. The free end of the lever 19 is provided with a pin 28 for engagement with a pin 21 projecting from the backside face of a ring member 7. A baseplate 12 is provided with a pin 29 which will abut against the side edge of the lever 19 when said lever 19 is rotated in a counterclockwise direction against the biasing force of the spring 22. Therefore, in screwing the lens assembly 1 into the camera body 5, the rotation of said lens assembly in its last turn is transmitted to the ring member 7 by the engagement of a recess 9 with a pin 10 and said ring member 7 causes the lever 19 to rotate in a counterclockwise direction through the engagement of the pins 21 and 28. Thus, the lever 19 engages the pin 29 at its side edge, causing the baseplate to move to the left against the biasing force of a spring 25. Means is provided for retaining the baseplate 12 in the position in which the lens assembly 1 being mounted on the camera body 5. This means includes a series of serration 30 formed along the side edge of the baseplate 12, a lever 32 pivotally connected to the camera body 5 at a pivot 31 and having a pawl for engagement with said serration 30, and a lever 33 similarly pivotally connected to the camera body at the pivot 31 and having the free end thereof extending for engagement with the end face 2a of the lens tube 2. The lever 32 is biased in a clockwise direction by a spring 34, with the pawl at the end extremity thereof being held away from the serration 30. The levers 32 and 33 are urged to move away from each other by a spring not shown. In mounting the lens assembly 1 on the camera body 5, the end extremity of the lever 33 abuts against the end face 2a of the lens tube 2 and is rotated thereby counterclockwise about the pivot 31. Consequently, the lever 32 is urged in a counterclockwise direction against the action of the spring 34 and the pawl at the end extremity thereof is bought into engagement with the serration 30. Thus, the baseplate 12 which has been moved to the position corresponding to the position of the lens assembly 1 screwed into the camera body 5, as described above, is retained in its position by the lever 32. According to this arrangement, there is the advantage that, since the screwing of the lens assembly is effected while holding the diaphragm ring 3 in the position of minimum-exposure aperture of the lens, the position of said diaphragm ring 3 can be determined positively and the mounting of the lens assembly is facilitated.

Although the present invention has been described and illustrated in detail herein with reference to particular embodiments thereof, it is to be understood that the invention is not restricted to the details of the embodiments shown but many changes and modifications are possible without deviating from the scope of the invention.

What is claimed is:

1. A photographic camera comprising a camera body and a lens assembly having a lens tube and adapted to be mounted on the front face of said camera body by screwing the same, said lens assembly having a rotatable diaphragm ring for manually adjusting the exposure aperture of the lens, and further including means for detecting the rotational position of said diaphragm ring and means combined with said first means for compensating an error in the position of said lens assembly relative to said camera body, said detecting means being a variable resistor consisting of a resistance element disposed interior of said camera body in such a manner that its position is adjustable, and a slider slidably contacting said resistance element and being moved incident to the rotation of said diaphragm ring; said compensating means including means for adjusting the position of said resistance element in accordance with the mounting position of the lens tube of the lens assembly relative to the camera body, the direction of screwing the lens tube into the camera body being the same as the direction in which the diaphragm ring is rotated to reduce the exposure aperture, said camera body being provided with a rotatable ring member rotated incident to the rotation of said diaphragm ring, said ring member operatively engaging said slider to move it according to the rotation thereof, and further the resistance element of said variable resistor being fixed to a baseplate the position of which is adjustable, said slider engaging a pin on said baseplate when the lens tube of the lens assembly is screwed into the camera body with said diaphragm ring being held in its minimum exposure aperture position, thereby moving said baseplate to a position corresponding to the mounting position of said lens tube; and means for retaining said baseplate in its position upon completion of the mounting of said lens tube, said means for retaining the baseplate consisting of a series of serration formed along the edge of said baseplate and a pawl member adapted to engage said serration upon being operated by the rear end of the lens tube.

* * * * *